UNITED STATES PATENT OFFICE.

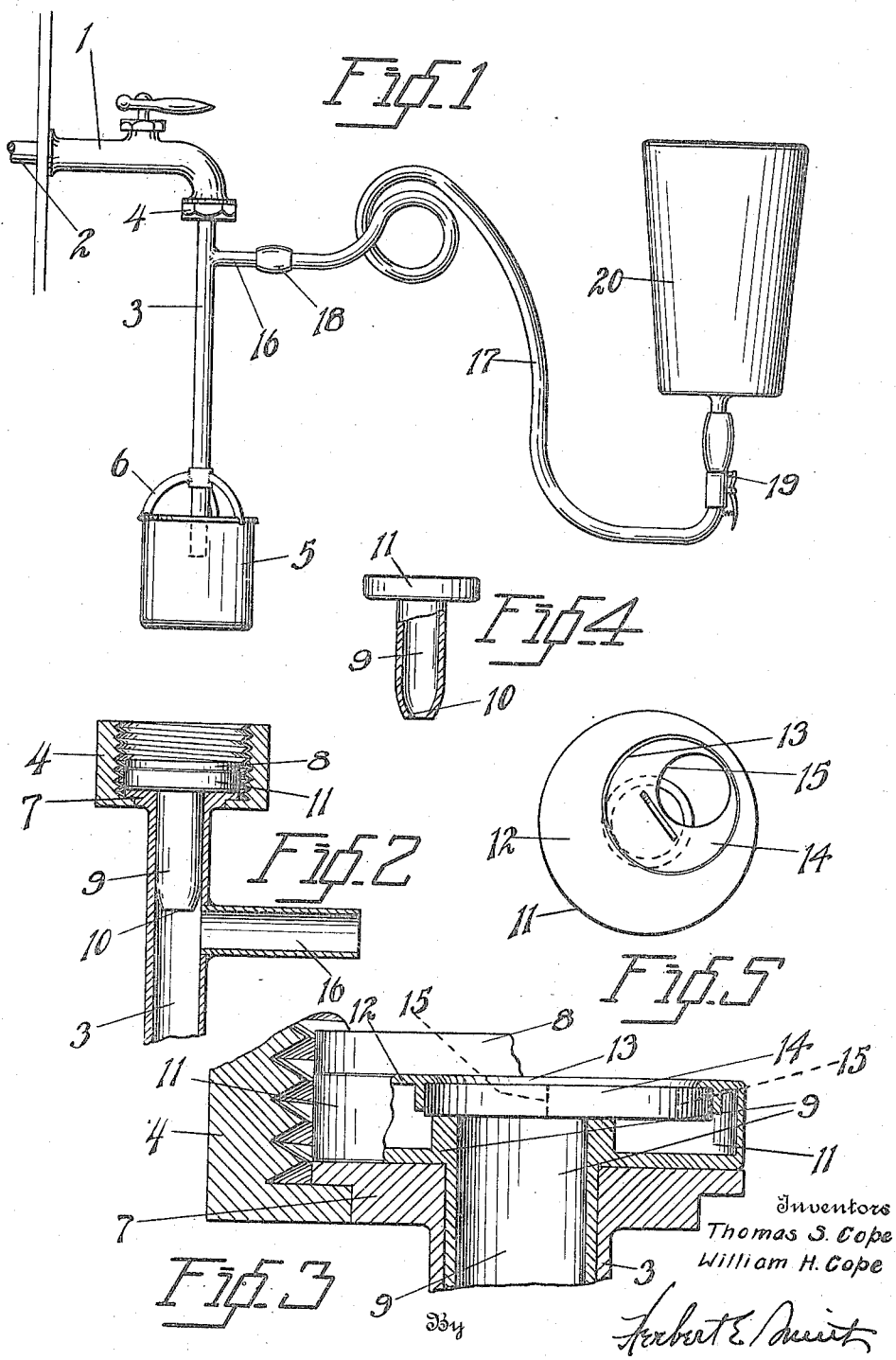

THOMAS STEPHEN COPE AND WILLIAM HENRY COPE, OF COEUR D'ALENE, IDAHO.

EXHAUSTING DEVICE FOR DEPURATORS.

1,269,910. Specification of Letters Patent. Patented June 18, 1918.

Application filed September 5, 1917. Serial No. 189,719.

*To all whom it may concern:*

Be it known that we, THOMAS S. COPE and WILLIAM H. COPE, citizens of the United States, residing at Coeur d'Alene, in the county of Kootenai and State of Idaho, have jointly invented certain new and useful Improvements in Exhausting Devices for Depurators, of which the following is a specification.

The present invention relates to improvements in exhausting devices for depurators, or vacuum cuppers, and is designed for the purpose of providing a surgical appliance of this character that may be conveniently used with effectiveness in local applications for increasing local blood circulation, for counter-irritation or as a means for the production of passive hyperemia.

The primary object of the invention is the provision of a suction apparatus adapted for use at the faucet of running water, or water under pressure, as in city houses, offices, etc., by means of which the depurator may be operated at slight expense, but with effective efficiency, and to this end the invention consists in certain novel combinations and arrangements of parts as will be hereinafter fully described and claimed.

In the accompanying drawings one complete embodiment of the invention is illustrated, constructed and arranged according to the best mode so far devised for the practical application of the principles of the invention.

Figure 1 illustrates the device of the invention installed for use with the faucet of the water pressure line which line may be in a residence, laboratory, or other suitable place.

Fig. 2 is an enlarged, sectional view of the faucet coupling, showing the nozzle in full elevation.

Fig. 3 is a further enlarged, sectional view of the faucet coupling showing also a rubber washer or gasket and the position of the eccentric cap for regulating the flow of pressure from the faucet.

Fig. 4 is a view of the nozzle, detached, and partly broken away to disclose its restricted outlet end.

Fig. 5 is a top plan view of the nozzle showing its head and the eccentric disk therein for regulating the flow of water through the nozzle.

In the preferred embodiment of the invention as illustrated in the drawings, the usual faucet 1 of the water supply pipe 2 is utilized for the supply, and the water passing through the faucet is of course under pressure. An outlet pipe 3 is added to the faucet, a coupling nut 4 being utilized for the purpose, and at the end of the outlet pipe a pail or bucket 5 is attached by means of the spider frame 6, to eliminate splash as the water enters the bucket flowing from the pipe. At its upper end the outlet pipe 3 is formed with a head 7 fitting within the open lower end of the coupling nut, and a rubber washer or gasket 8 is provided for preventing leaks at the coupling.

One of the most important elements of the invention is the nozzle 9 located within the upper end of the outlet pipe and adapted to regulate the flow of water from the faucet through the outlet pipe 3. At its outlet end the nozzle is provided with a constricted opening 10 and its upper end is formed with a hollow head 11 of sufficient diameter to fit properly within the coupling nut of the outlet pipe just over the head 7 of this pipe. The top wall 12 of the hollow head is provided with a circular opening 13, located eccentrically to the nozzle proper, and in this opening is adapted to be revolved a circular disk 14, also formed with an eccentrically located opening 15 approximately the size of the opening through the nozzle. It will readily be seen that because of its eccentricity, when the disk is revolved, the opening 15 in the disk may be brought into position to register with the opening through the nozzle, or the opening may be turned out of axial alinement with the nozzle opening, as in Fig. 5 to reduce the area of the passage through which water may flow. In this manner the flow of water through the nozzle may be regulated, thus rendering the device especially adaptable for use where the normal supply of water is different, or where only a partial vacuum is required in the appliance.

For connecting the depurator or cupper to the water pipe I employ a branch pipe 16, integral with and projecting from the outlet pipe just below the faucet coupling, and the relation between the branch pipe and the nozzle in the outlet pipe is such that the constricted opening of the nozzle is located just above the juncture of the outlet pipe and its branch, so that the water flowing through the nozzle passes across the opening of the branch pipe at its place of communication with the outlet pipe. The hose or rubber pipe 17 which forms the vacuum pipe is coupled at 18 to the branch pipe, and a valve 19 in this hose controls passage of air through the hose from the cupper 20. The depurator or cupper may be of glass, hard rubber etc., and is of usual and suitable size and shape for effective work, and the usual functions of such devices may be performed with this cupper.

The operation of the appliance will be evident from the drawings taken in connection with this description, and it will be sufficient to point out that the passage of water from the faucet through the nozzle and outlet pipe, by suction, draws the air through the cupper, regulating valve (when open) vacuum hose and branch pipe and finally the outlet pipe, thus creating a vacuum in the cupper. This vacuum is maintained as long as the water flows, and its degree may be regulated by the valve in the vacuum pipe, while the flow of water, as before described, may be regulated through the instrumentality of the eccentric disk in the nozzle head.

From the above, it will be evident that a most effective surgical appliance is provided which performs the functions of a comparatively perfect device with facility and despatch, and at the same time with only slight expense.

What we claim is:—

The combination with a running water fixture, an outlet pipe, and an air suction hose connected to the pipe and having a depurator at its free end, of a coupling nut between the fixture and outlet pipe and a water nozzle in the outlet pipe, said nozzle fashioned with a chambered head in said coupling nut, and an eccentric revoluble disk in said chambered head having an opening therein adapted to register or partly register with the opening in said nozzle.

In testimony whereof we affix our signatures.

THOMAS STEPHEN COPE.
WILLIAM HENRY COPE.

Copies of this patent may be obtained for five cents each, by addressing the "Commissioner of Patents, Washington, D. C."